US011135930B2

(12) United States Patent
Traverso et al.

(10) Patent No.: US 11,135,930 B2
(45) Date of Patent: Oct. 5, 2021

(54) MAGNETICALLY-DISPLACING CHARGING STATION

(71) Applicant: inVia Robotics, Inc., Westlake Village, CA (US)

(72) Inventors: Joseph Traverso, Simi Valley, CA (US); Randolph Charles Voorhies, Sherman Oaks, CA (US); Daniel Frank Parks, II, Los Angeles, CA (US); Lior Elazary, Agoura Hills, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 116 days.

(21) Appl. No.: 16/428,601

(22) Filed: May 31, 2019

(65) Prior Publication Data

US 2020/0376973 A1  Dec. 3, 2020

(51) Int. Cl.
| | | |
|---|---|---|
| *B60L 53/35* | (2019.01) | |
| *B60L 53/16* | (2019.01) | |
| *H02J 7/00* | (2006.01) | |
| *H01F 7/20* | (2006.01) | |
| *H01R 13/631* | (2006.01) | |
| *H01R 13/62* | (2006.01) | |

(52) U.S. Cl.
CPC .............. *B60L 53/35* (2019.02); *B60L 53/16* (2019.02); *H01F 7/20* (2013.01); *H01R 13/6205* (2013.01); *H01R 13/6315* (2013.01); *H02J 7/0042* (2013.01)

(58) Field of Classification Search
CPC ........ B60L 53/35; B60L 53/16; H02J 7/0042; H01R 13/625; H01R 13/6315; H01F 7/20
USPC ........................................................ 320/109
See application file for complete search history.

(56) References Cited

U.S. PATENT DOCUMENTS

| | | | | |
|---|---|---|---|---|
| 6,957,712 | B2* | 10/2005 | Song et al. ........... | A47L 9/2894 180/167 |
| 8,299,750 | B2* | 10/2012 | Pai ........................ | H02J 7/0044 320/107 |
| 8,961,695 | B2* | 2/2015 | Romanov et al. ... | A47L 11/4091 134/18 |
| 10,788,836 | B2* | 9/2020 | Ebrahimi Afrouzi et al. .............. | G05D 1/0212 |
| 2008/0174268 | A1* | 7/2008 | Koo et al. ............ | G05D 1/0234 320/109 |

* cited by examiner

*Primary Examiner* — Sun J Lin
(74) *Attorney, Agent, or Firm* — Ansari Katiraei LLP; Arman Katiraei; Sadiq Ansari

(57) ABSTRACT

A magnetically-displacing charging station includes a front wall with an opening about its center, and a charging interface with a back wall, at least one support extension, a magnet, and a charging plug. The back wall is disposed behind the front wall and is larger than the opening. The at least one support extension extends through the opening with a proximal end connected to the back wall, and a distal end that extends out in front of the front wall and that retains the magnet and charging plug. The charging station further includes springs connected to the front wall at one end, and to the back wall at an opposite end. The springs provide a default position for the charging interface within the opening, and further provide for a displacement of the charging interface about the opening in response to magnetic or other forces.

17 Claims, 12 Drawing Sheets

MAGNETICALLY-DISPLACING CHARGING STATION

BACKGROUND INFORMATION

Robots may include an onboard battery to power various sensors and actuators with which the robots perform different operations autonomously. The battery has a finite supply of power, and therefore requires periodic charging. To be fully autonomous, the robots should be able to connect their batteries to a power source when charging is required, and to disconnect from the power source, without human intervention, before resuming operations.

FIG. 1 illustrates a prior art solution to assist a robot in connecting and disconnecting from a charging apparatus 110. The solution consists of rigid protruding male element 120 on one of the robot or charging apparatus 110, and protruding conical guide with female charging interface 130 at another one of the robot or charging apparatus 110.

These and other prior art solutions allow a robot to connect to charging apparatus 110 using imprecise movements. In particular, the robot may be misaligned when approaching charging apparatus 110, but protruding conical guide 130 may correct for the misalignment by guiding male element 120 into the female charging interface in order to connect the two together and allow the flow of power from a power source of charging apparatus 110 to the robot battery.

These and other prior art solutions have several shortcomings. Charging apparatus 110 must be anchored or otherwise attached to a solid or heavy surface to prevent movement when a robot collides with charging apparatus 110 in order to force a connection between male element 120 and female charging interface 130. Accordingly, charging apparatus 110 cannot be easily moved or relocated.

Also, the continual impact from different robots using motive forces to connect male element 120 to female charging interface 130, often with some misalignment, can damage one or more of male element 120 or female charging interface 130. For instance, the electrodes or prongs of male element 120 may bend or break off after repeatedly hitting the surface of protruding conical guide 130 and/or being the point at which the motive force of a misaligned robot is redirected. This is especially dangerous since electricity is involved, and can result in sparks, short circuits, fires, and/or other physical damage or harm. Also, since the motive force is required to connect male element 120 to female charging interface 130, insufficient force or force imposed from an incorrect angle may lead to an improper connection that prevents the battery from receiving power from the charging apparatus. Accordingly, a robot may make several adjustments to its positioning and/or several attempts before establishing a proper connection to charging apparatus 110. Each such adjustment or attempt takes time and lessens the efficiency of the robots as the robots are prevented from completing other tasks. Moreover, placing either of rigid protruding male element 120 or protruding conical guide with the female charging interface 130 on the robot changes the dimensions of the robot, and can disrupt operation of the robot when operating in confined spaces or spaces that require exact movements.

DETAILED DESCRIPTION OF PREFERRED EMBODIMENTS

The following detailed description refers to the accompanying drawings. The same reference numbers in different drawings may identify the same or similar elements.

Disclosed is a charging station with a magnetically-displacing charging interface. The magnetically-displacing charging interface may move about three different planes (e.g., x, y, and z planes or length, height, and depth planes), and may use magnetic forces to correct for misalignment between a robot's charging port and the charging interface of the charging station. In other words, the charging station provided herein primarily relies on magnetic forces, instead of motive forces, to correct for misalignment between the robot and the charging station, and to establish a power and/or data delivery connection between the two in a safe and non-damaging manner.

Figure 1:
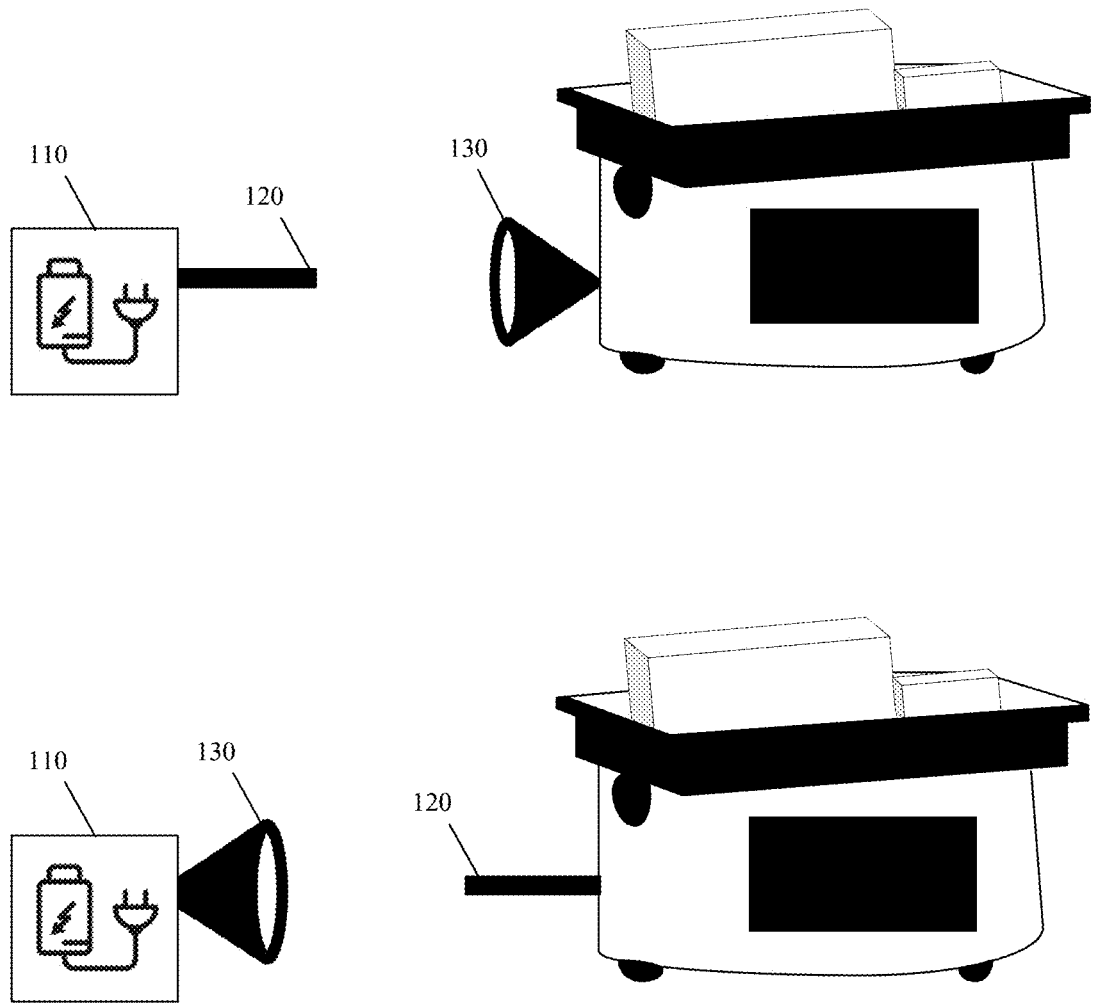
FIG. 1 illustrates a prior art solution to assist a robot in connecting and disconnecting from a power source.

Unlike the prior art solutions depicted in FIG. 1 and other prior art solutions, motive forces are not needed to force a connection between the charging station and a robot, and/or between a charging interface and a charging port. Rather, the charging station provided herein allows the connection to be established by locating the charging port of the robot in range of a magnetic field created from a distal end of the charging interface. The magnetic field then attracts the magnetically-displacing charging interface to the charging port. In doing so, the magnetically-displacing charging interface may safely correct for any misaligned separation between the two without the robot having to reposition itself, and may establish a connection between the two without damaging the sensitive electrical components through which power or electricity may flow from the charging station to a battery at the terminal end of the charging port.

Figure 2:
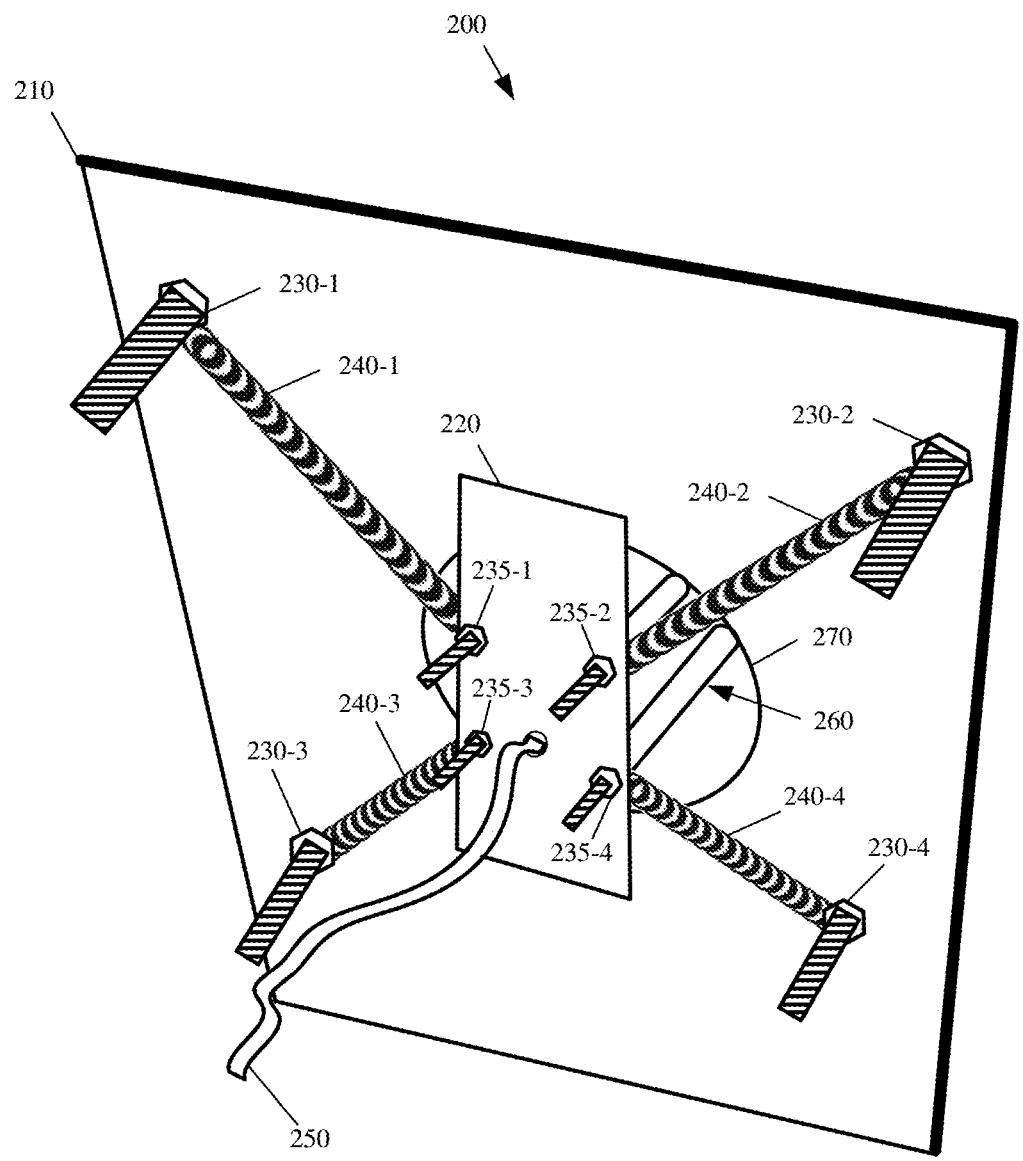
FIG. 2 presents a perspective back view of a charging station with a magnetically-displacing charging interface in accordance with some embodiments described herein.
Figure 3:
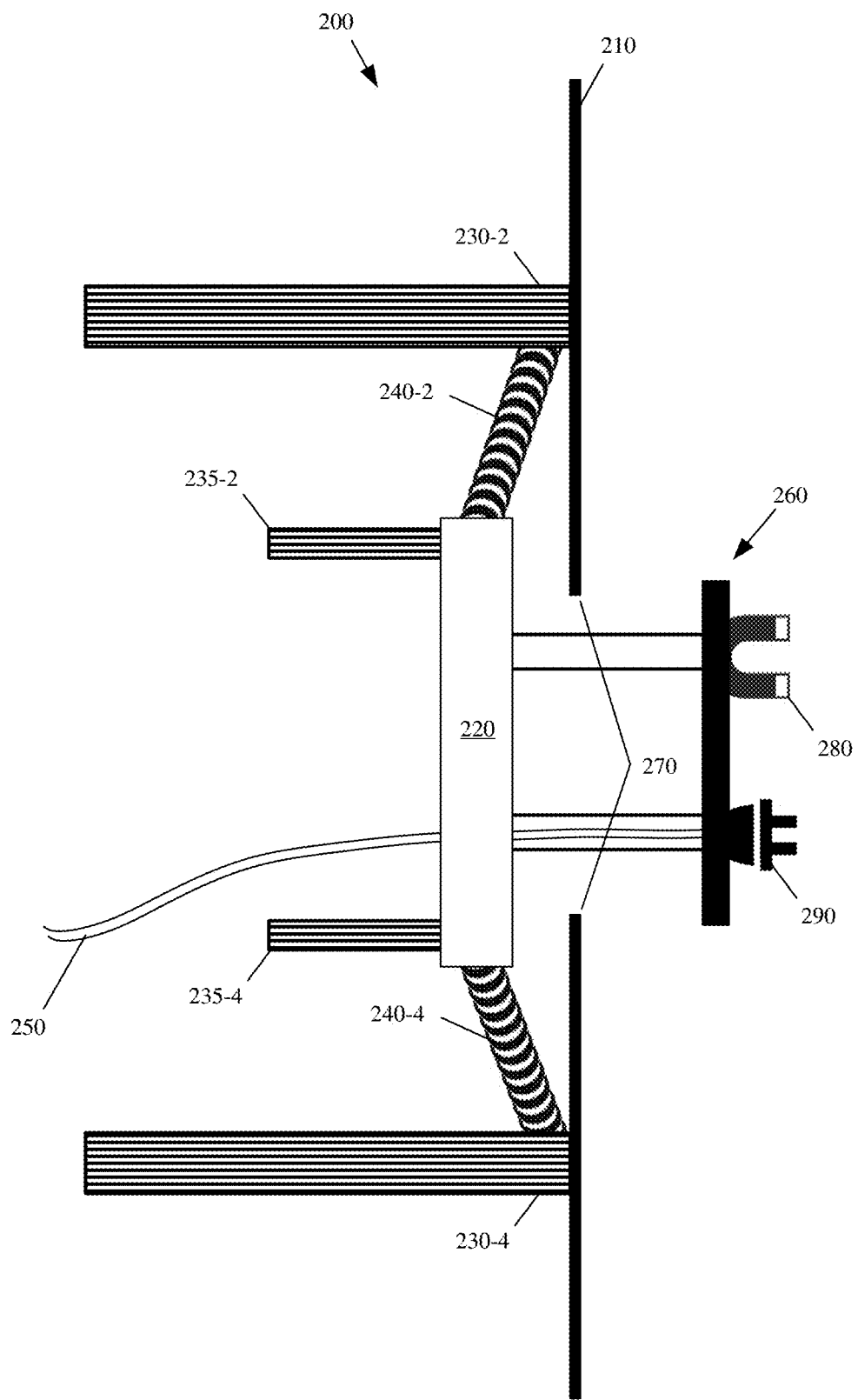
FIG. 3 presents a side view of the charging station with the magnetically-displacing charging interface in accordance with some embodiments described herein.
Figure 4:
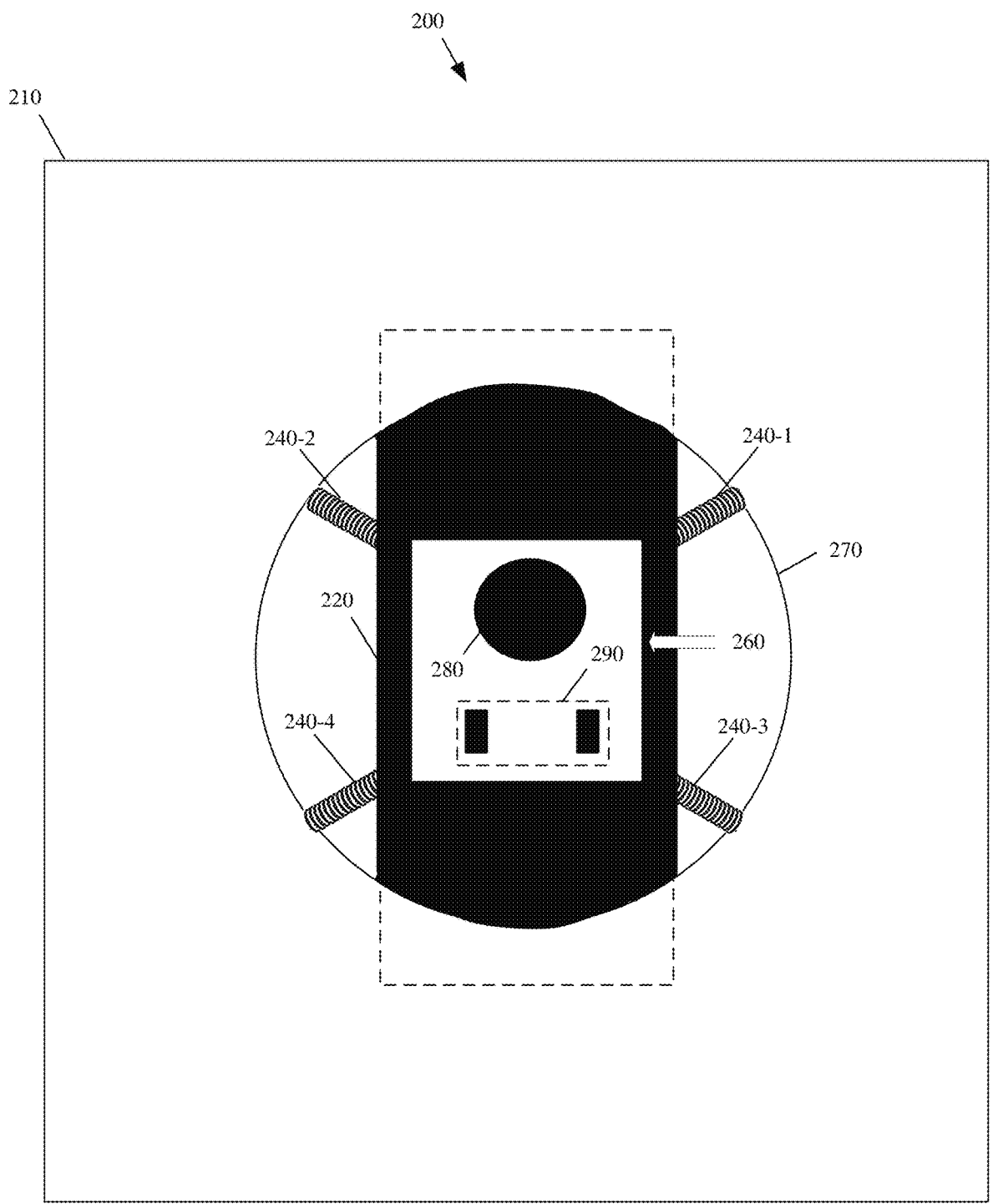
FIG. 4 presents a front view of the charging station with the magnetically-displacing charging interface in accordance with some embodiments described herein.

FIGS. 2, 3, and 4 present charging station 200 with the magnetically-displacing charging interface in accordance with some embodiments described herein. In particular, FIG.

2 presents a perspective back view of charging station 200; FIG. 3 presents a side view of charging station 200; and FIG. 4 presents a front view of charging station 200.

As shown in FIGS. 2-4, charging station 200 may include front wall 210, back wall 220, first set of anchor points 230-1, 230-2, 230-3, 230-4 (herein sometimes collectively referred to as "anchor points 230" or individually as "anchor point 230"), second set of anchor points 235-1, 235-2, 235-3, 235-4, springs 240-1, 240-2, 240-3, and 240-4 (herein sometimes collectively referred to as "springs 240" or individually as "spring 240"), power supply 250, and magnetically-displacing charging interface 260. In some embodiments, charging station 200 may have a different arrangement of components, more or less components (e.g., fewer anchor points 230 and/or springs 240), and/or different dimensions.

Front wall 210 may include a first rigid surface or plate. Front wall 210 may be formed from a metal, aluminum, plastic, or other rigid material. Front wall 210 may be sized proportionate to one or more robots, and may provide a solid barrier to prevent a robot, human, or other object from damaging components about the backside of front wall 210. Front wall 210 may have a rectangular or other shape to support mounting of charging station 200 against another surface. For instance, front wall 210 may be mounted on different legs of a storage rack. In some embodiments, charging station 200 may be fully enclosed within a housing, and front wall 210 may represent one side of the housing. Front wall 210 may include opening 270.

Opening 270 may include a hole that is cut out of front wall 210. Although opening 270 is shown with a circular shape, opening 270 may have any shape so long as at least one dimension of opening 270 is smaller than a corresponding dimension of back wall 220. Opening 270 may provide an aperture that allows charging interface 260 to extend from the backside of front wall 210 through and past the frontside of front wall 210 as best seen in FIG. 3.

Back wall 220 may include a second rigid surface or plate that is disposed about the backside of front wall 210 by first set of anchor points 230, second set of anchor points 235, and springs 240. Back wall 220 may move vertically, horizontally, and/or depth wise by extension or contraction of springs 240 when force is applied to charging interface 260 and charging interface 260 is mounted to, attached to, or otherwise connected to back wall 220. In some embodiments, back wall 220 may be disposed about the backside of front wall 210 with one or more rubber grommets or other pliant elements that provide three-dimensional displacement of back wall 220, and that are attached to one or more of first set of anchor points 230. In any configuration, the displacement of back wall 220 is limited by virtue of back wall 220 having at least one dimension (e.g., height, width, radius, etc.) that is larger than a corresponding dimension of opening 270, such that back wall 220 may not pass through opening 270 from a backside to a frontside of front wall 210.

First set of anchor points 230 may include a first set of bolts with extensions that pass through holes about front wall 210 from a frontside of front wall 210. The head of each bolt may be larger than the holes such that the head abuts against the frontside of front wall 210. The holes for each bolt and the placement of each bolt may be equidistant from opening 270.

Similarly, second set of anchor points 235 may include a second set of bolts. The extension of each bolt from the second set of bolts may pass through a different hole about back wall 220 from a frontside of back wall 220. The holes about back wall 220 may be equidistant.

In some embodiments, each spring 240 may have one end that is inserted over an extension of one of the first set of bolts (e.g., an anchor point 230), and another end that may be inserted over an extension of a closest bolt from the second set of bolts (e.g., an anchor point 235) such that the spring 240 is attached to each bolt. A nut may then be screwed over each bolt extension to secure the first set of bolts against front wall 210, the second set of bolts against back wall 220, one end of each spring 240 to one anchor point 230, and the opposite end of each spring 240 to one anchor point 235. For instance, each spring 240 may include circular ends that can be passed over and through the bolt extensions, and locked in place with a nut that is screwed over the bolt extension and that sandwiches the circular end of spring 240 against the backside of either front wall 210 or back wall 220.

As shown in FIG. 2, spring 240-1 has one end anchored to anchor point 230-1, and another end anchored to anchor point 235-1. Similarly, spring 240-2 has one end anchored to anchor point 230-2, and another end anchored to anchor point 235-2. The four complimentary anchor points 230 and 235 connected by springs 240 provide a default position for back wall 220 behind and away from a backside of front wall 210. The four complimentary anchor points 230 and 235 and springs 240 also allow back wall 220 to move vertically, horizontally, towards, and away relative to front wall 210 when force is applied, and will restore the default position of back wall 220 relative to front wall 210 when the force is removed.

Springs 240 may include coils, torsion springs, helical springs, compression springs, tension springs, leaf springs, and/or other objects with elastic properties. Each spring 240 may have the same properties (e.g., same length, same spring constant, etc.) as other springs 240. In some embodiments, springs 240 may limit the displacement of charging interface 260, that is connected to back wall 220, to remain within opening 270.

As noted above, some embodiments may replace springs 240 with one or more rubber grommets or other pliant elements that connect to one or more of anchor points 230 and 235 in order to provide a default position for back wall 220 behind front wall 210, and to further allow for displacement of back wall 220 about different planes.

Power supply 250 may include one or more wires that transfer power (e.g., electricity) from a continuous power source (e.g., a wall outlet) to charging interface 260. In some embodiments, power supply 250 may include a voltage regulator, a power adapter, or other electrical convertor. In some embodiments, power supply 250 may be a backup battery from which robots and/or other devices may be recharged.

In some embodiments, charging interface 260 is mounted to, attached to, or otherwise connected to back wall 220. Charging interface 260 may include one or more support extensions.

A proximal end of each support extension may be attached to back wall 220. Each support extension may then extend from back wall 220 through opening 270 and past a frontside of front wall 210. The distal ends of the support extensions may be mounted to, attached to, or otherwise connected to a magnetic charging head at the distal end of charging interface 260.

The magnetic charging head may be flat surface with one or more magnets 280 and charging plug 290. In some embodiments, each magnet 280 may be directly connected to the distal end of a support extension, and charging plug 290 may be directly connected to the distal end of another support extension.

In some embodiments, the support extensions may include rigid hollowed tubes or beams. Wiring from power supply 250 may pass through one or more of the support extensions in order to deliver power to plug 290.

Plug 290 may include a male end with one or more protruding prongs or electrodes that can be used to establish a power delivery connection with a corresponding female end found on a robot or other device with a battery that is charged by charging station 200. Alternatively, plug 290 may include a female end with one or more receptables or electrodes that can be used to establish a power delivery connection with prongs or matching electrodes of a corresponding male end found on a robot or other device with a battery that is charged by charging station 200.

In some embodiments, plug 290 may have different power and/or data transfer connectors. For instance, plug 290 may include a set of pins. Each pin of the set of pins may be connected to a different wire of power supply 250 for power transfer, and/or a wire that can be used for data transfer. The pins may be spring-loaded and may be aligned similar to a corresponding set of pins found on a charging port of a robot or other device that uses charging station 200 to charge. In some embodiments, plug 290 may include a set of plates that can be aligned with corresponding plates on the charging port of a robot. Each plate of the set of plate may be connected to a different wire of power supply 250 for power transfer, and/or a wire that can be used for data transfer.

In some embodiments, magnet 280 and/or plug 290 may be mounted to charging interface 260 with one or more displacement elements. The displacement elements may allow magnet 280 and/or plug 290 to move about one or more planes. In particular, the movements of magnet 280 and/or plug 290 may be independent of back wall 220 and charging interface 260 displacement provided by springs 240. The separate and/or secondary displacement of magnet 280 and/or plug 290 enhance support for establishing connections with a misaligned charging port of a robot or other device.

Figure 5A:
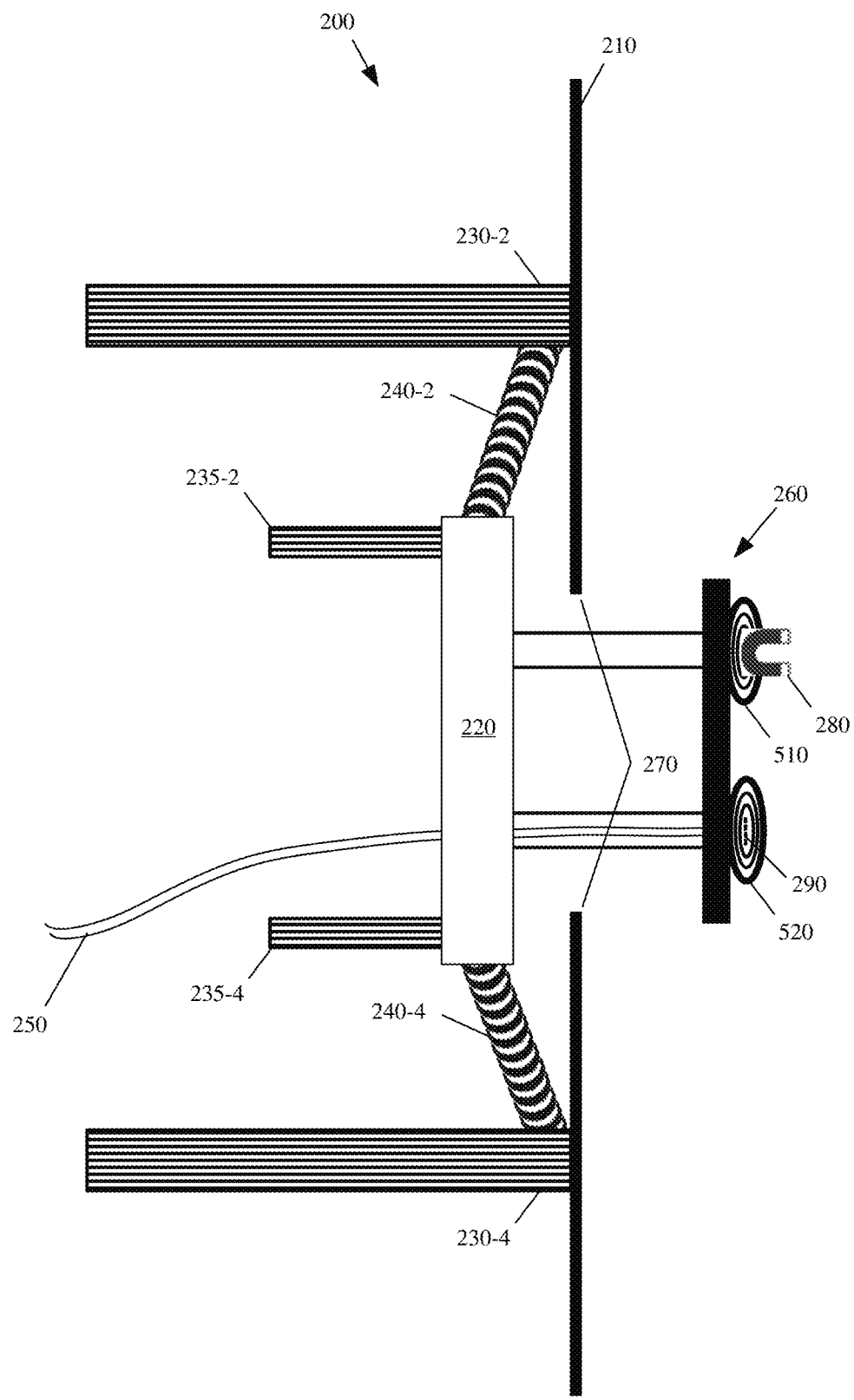
FIGS. 5A and 5B illustrate a charging station with a magnetically-displacing charging interface and secondary displacing magnet and plug on the charging interface in accordance with some embodiments described herein.
Figure 5B:
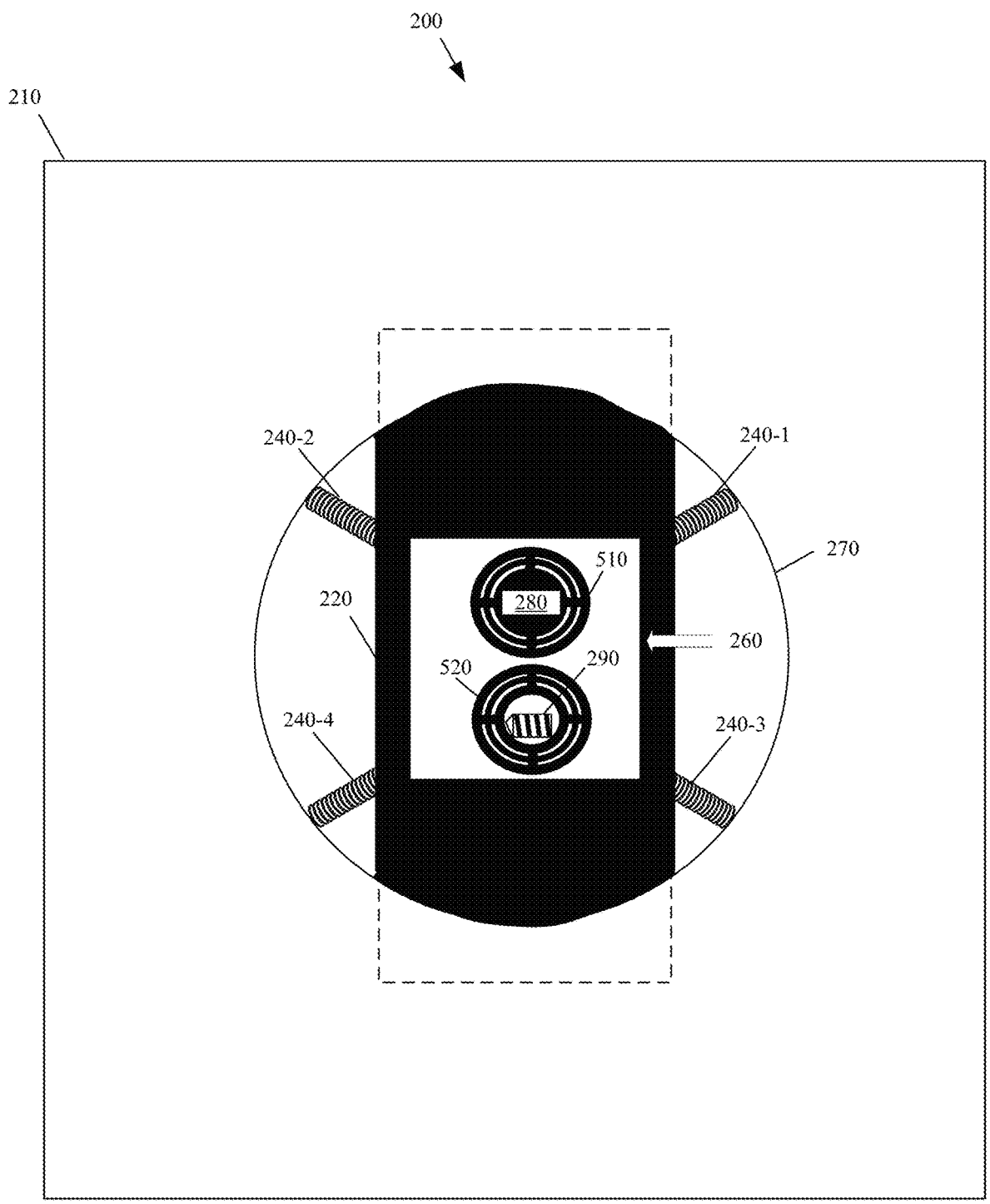

FIGS. 5A and 5B illustrate charging station 200 with magnetically-displacing charging interface 260 and secondary displacing magnet 280 and plug 290 on charging interface 260 in accordance with some embodiments described herein. In FIGS. 5A and 5B, magnet 280 and plug 290 are connected to charging interface 260 by rubber grommets 510 and 520 respectively. For instance, magnet 280 may be mounted on the distal end of rubber grommet 510, and the proximal end of rubber grommet 510 may be attached to charging interface 260 or the distal end of a support extension. Similarly, plug 290 may be mounted on the distal end of rubber grommet 520, and the proximal end of rubber grommet 520 may be attached to charging interface 260 or the distal end of a support extension.

Each rubber grommet 510 and 520 is a pliant displacing element. In particular, the distal end of each rubber grommet 510 and 520 can be displaced about three-dimensions relative to the proximal end when some force (e.g., magnetic, motive, etc.) is exerted on the distal end. Accordingly, magnet 280 and/or plug 290 may be displaced in order to correct for a misalignment between the magnet and/or charging port of a robot or other device attempting to connect to charging station 200.

In some embodiments, rubber grommets 510 and 520 may be replaced by a set of springs, by a ball and socket joint, or other displacing elements that provide for similar displacement of magnet 280 and plug 290. In some embodiments, magnet 280 may be directly attached to charging interface 260 without grommet 510 while plug 290 remains mounted to grommet 520. In some embodiments, magnet 280 may be integrated around or with plug 290, and the combined magnetic plug may be mounted on a single grommet, displacing element, or other pliant element. FIGS. 5A and 5B illustrate plug 290 with a set of spring-loaded pins. Each of the pins can be used for power delivery or data transfer as will be further described below.

Charging station 200 may be placed on the floor or other elevated surface with charging interface 260 disposed at a position (e.g., height and/or orientation) that is aligned with a corresponding charging port of a robot or other device that relies on charging station 200 to recharge. Accordingly, the arrangement and dimensions of components illustrated in FIGS. 2-5B may change to accommodate robots or other devices with charging ports at different heights, orientations, and/or other positions. For instance, a first embodiment of charging station 200 may elevate plug 290 12 inches above a surface on which charging station 200 rests to align with a charging port of a robot that is 12 inches above the surface, and a second embodiment of charging station 200 may elevate plug 290 18 inches above a surface on which charging station 200 rests to align with a charging port of a robot that is 18 inches above the surface.

Different embodiments may adapt charging station 200 to have more or less springs 240 and anchor points 230 and 235, different positioning of springs 240 and anchor points 230 and 235, and/or components of different sizes, shapes, placements, and/or dimensions. The arrangement and dimensions of components illustrated in FIGS. 2-5B may also change to support different connectivity and/or charging ports of robots or other devices.

Figure 6A:
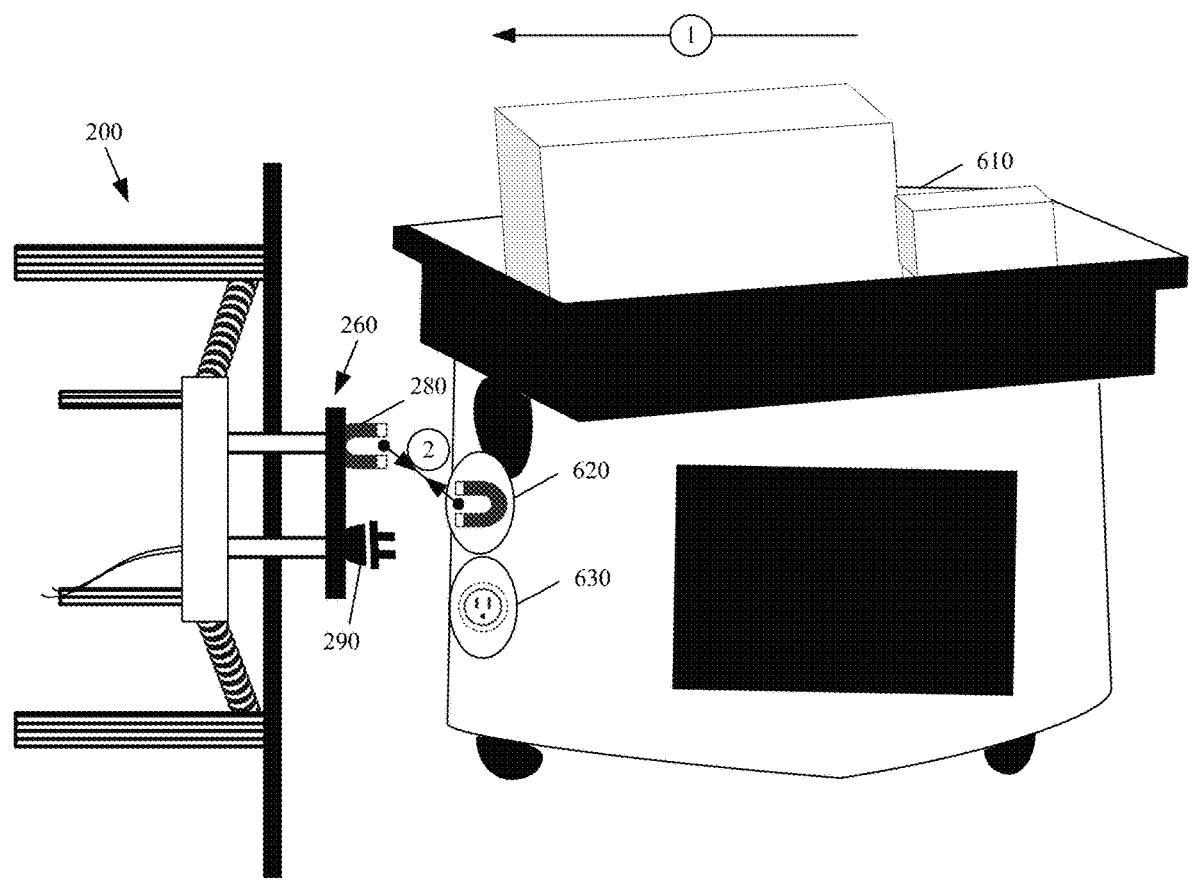
FIGS. 6A and 6B illustrate usage and operation of the charging station with the magnetically-displacing charging interface for autonomous charging of a robot in accordance with some embodiments described herein.
Figure 6B:
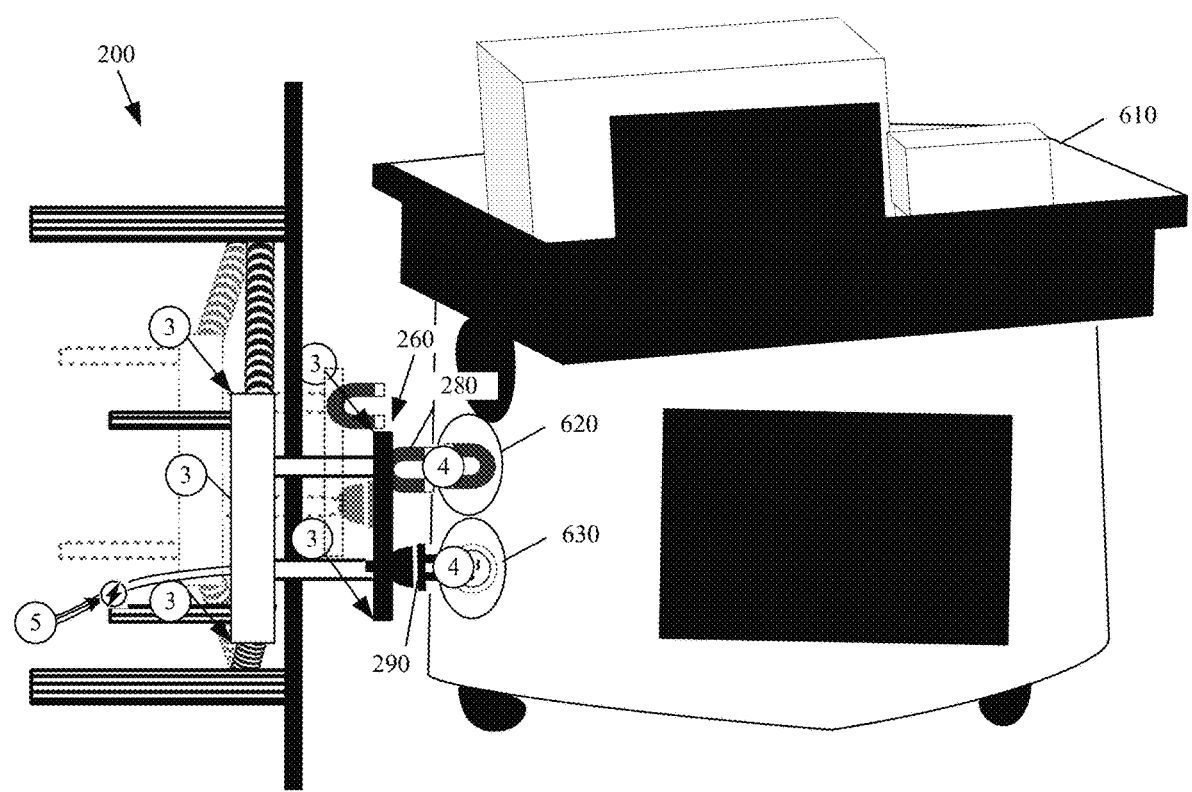

FIGS. 6A and 6B illustrate usage and operation of charging station 200 for autonomous charging of a robot in accordance with some embodiments described herein. FIG. 6A illustrates robot 610 moving (at 1) towards charging station 200. Specifically, robot 610 moves (at 1) to bring magnet 620 and charging port 630 of robot 610 next to charging interface 260 of charging station 200.

In some embodiments, charging port 630 may be a receptacle for connecting to charging plug 290, and for transferring power from charging station 200 to a battery of robot 610 upon establishing a connection between charging port 630 and charging plug 290. In some embodiments, charging port 630 may provide a female charging coupler, and charging plug 290 may provide a male charging coupler. For instance, charging port 630 may include one or more recessed electrodes that can connect to one or more protruding electrodes of charging plug 290. In some other embodiments, charging port 630 may provide a male charging coupler, and charging plug 290 may provide a female charging coupler. For instance, charging port 630 may include one or more protruding electrodes that can connect to one or more recessed electrodes of charging plug 290.

In some embodiments, the electrodes of charging port 630 and charging plug 290 may be exposed wires, pins, or other elements in a fixed position that can transfer power (e.g., current) from charging station 200 to a battery of robot 610 when aligned. In some embodiments, the protruding electrodes may be one or more prongs, and the recessed electrodes may be an outlet into which the prongs may be inserted. In some embodiments, charging port 630 and charging plug 290 may include a second set of magnets to assist in aligning and safely connecting the electrodes of charging port 630 to the electrodes of charging plug 290.

Robot 610 may be programmed with a position of charging station 200, or may identify charging station 200 using one or more scanners or sensors of robot 610. For instance, each charging station 200 may include a fiducial, visual identifier, or other salient queue on a frontside of front wall 210 that robot 610 can detect with a scanner, camera, or other sensor. Robot 610 may then adjust its positioning based on the size, orientation, and shape of the fiducial, visual identifier, or other salient queue in order to move (at 1) toward charging interface 260.

As shown in FIG. 6A, the movements (at 1) of robot 610 may be imprecise such that magnet 620 of robot 610 may be misaligned on one or more planes with magnet 280 of charging interface 260. However, as robot 610 moves close enough to charging station 200, without touching charging interface 260 or by lightly making contact with charging interface 260, magnetic forces may attract (at 2) magnet 280, on the magnetically-displacing charging interface 260 of charging station 200, to magnet 620 on robot 610.

In some embodiments, magnet 620 is placed at a height on robot 610 that is aligned with a height of magnet 280 on charging interface 260 when charging interface 285 is at its default resting position. In some such embodiments, the misalignment between robot 610 and charging station 620 may strictly be a horizontal misalignment.

In some embodiments, magnet 280 on charging interface 260 may have a first polarity, and magnet 620 of robot 610 may have a second polarity that is opposite to the first polarity, thereby creating the force that attracts (at 2) magnets 280 and 620 together when brought within proximity of one another. In some embodiments, one or more of magnets 280 and 620 may be electromagnetics that use electricity to amplify the strength of the magnetic field, and allow for attraction (at 2) from greater distances.

In any case, magnet 620 may be fixed at a particular position on robot 610, and robot 610 may be too heavy to move to correct for a misalignment using just the magnetic forces. However, charging interface 260 is attached to back wall 220 via springs 240 or other displacing or pliant elements that allow for magnetic displacement of charging interface 260 when magnet 280 experiences a magnetic field or magnetic forces that pull magnet 280 and charging interface 260 towards magnet 620 of robot 610 or another nearby magnet. The magnetic forces can displace charging interface 260 one or more inches from its default resting position depending on the strength of the magnetic forces, the elasticity of springs 240, weight of charging interface 260, and/or other factors.

FIG. 6B illustrates the magnetic displacement of charging interface 260 leading to a connection with which the battery of robot 610 may be charged. For instance, magnet 620 on robot 610 attracts magnet 280 on charging interface 260. As shown in FIG. 6B, the attraction and magnetic forces displace (at 3) charging interface 260 towards front wall 210, downwards, and/or sideways within opening 270 of front wall 210.

The displacement (at 3) of charging interface 260 moves magnet 280 of charging interface 260 in alignment with magnet 620 of robot 610, and causes magnets 280 and 620 to connect (at 4). The displacement (at 3) of charging interface 260 also moves charging plug 290 of charging interface 260 in alignment with charging port 630 of robot 610 such that charging plug 290 connects (at 4) to charging port 630. The connection may be established when electrodes or prongs of plug 290 are placed onto or over corresponding electrodes of charging port 630. Charging plug 290 and charging port 630 may have their own set of magnets to aid in establishing the connection between the two.

In this manner and with use of magnetic forces, the power delivery connection may be established without robot 610 forcefully pushing charging port 630 onto or into charging plug 290 with motive forces, and/or without robot 610 realigning its positioning relative to the positioning of charging station 200. Instead, charging interface 260 of charging station 200 adjusts its positioning relative to the positioning of robot 610, thereby leading to a more efficient and safer connection being established using fewer attempts by robot 610 and with less likelihood of damaging either charging station 200 or robot 610.

Once charging plug 290 is connected (at 4) to charging port 630, power may immediately begin to flow (at 5) from power supply 250 over the wires to charging plug 290 and through to charging port 630 to a battery that is at the terminal end of charging port 630. The flow (at 5) of power can recharge the battery of robot 610.

Robot 610 may also autonomously disconnect from charging station 200 after charging. Specifically, robot 610 need only pull away from charging station 200. In doing so, front wall 210 will restrict movement of back wall 220. Consequently, as robot 610 continues to pull away, the connection between magnets 280 and 620 is broken, and the connection between charging plug 290 and charging port 630 is disengaged.

Figure 7A:
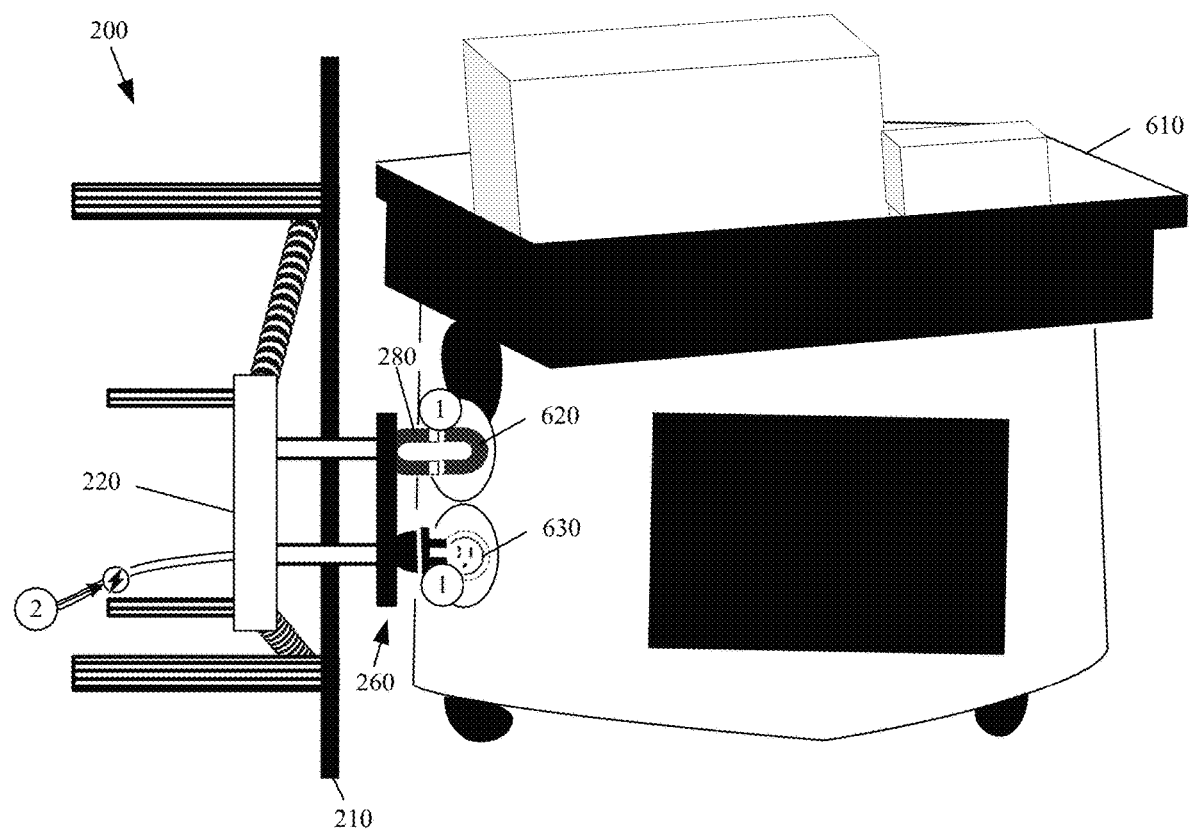
FIGS. 7A and 7B illustrate an example manner of operation by which the charging station allows a robot to autonomously disconnect from the charging station in accordance with some embodiments described herein.
Figure 7B:
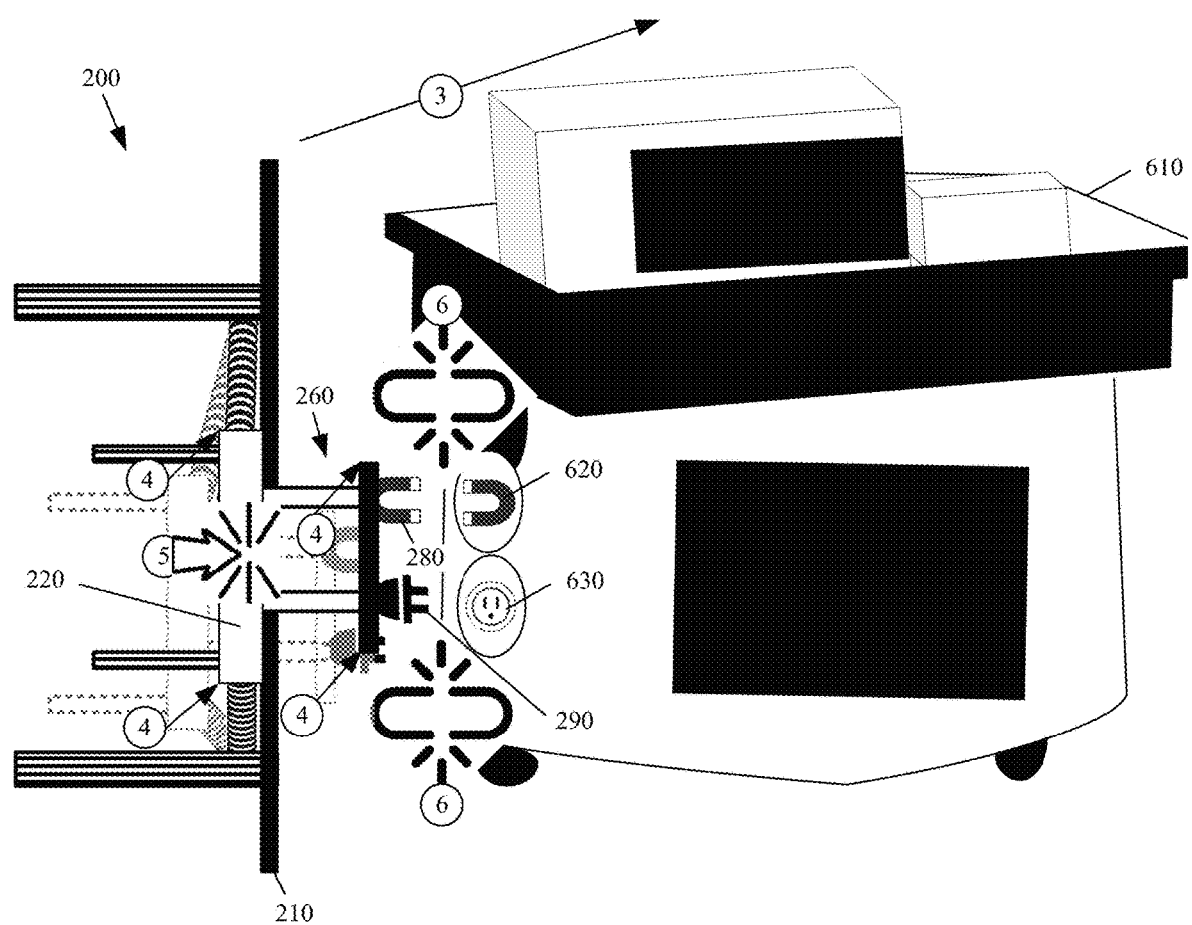

FIGS. 7A and 7B illustrate an example manner of operation by which charging station 200 allows robot 610 to autonomously disconnect from charging station 200 in accordance with some embodiments described herein. FIG. 7A illustrates robot 610 being connected (at 1) to charging station 200, and receiving (at 2) power from charging station 200. FIG. 7B illustrates robot 610 moving (at 3) away from charging station 200 to disconnect from charging station 200 and to perform other operations.

Charging station 200 remains connected to robot 610 during an initial set of movements that move (at 3) robot 610 away from charging station 200. These initial set of movements displace (at 4) charging interface 260. In particular, robot 610 remains connected to charging interface 260, and robot 610 pulls (at 4) charging interface 260 through opening 270 of front wall 210 until back wall 220, that is connected to charging interface 260, contacts (at 5) front wall 210. Back wall 220 contacts (at 5) front wall 210 because at least one dimension of back wall 220 is larger than a corresponding dimension of opening 270. The mismatch in size prevents back wall 220 from passing through opening 270. Upon back wall 220 contacting front wall 210, charging interface 260 cannot be displaced any further.

As robot 610 continues moving (at 3) away from charging station 200, the magnetic connection between magnets 280 and 630 is broken (at 6), and charging plug 290 is disengaged (at 6) from charging port 630 of robot 610. Here again, excessive motive force is not needed. Robot 610 simply has to move with a motive force that is greater than the magnetic force between magnets 280 and 620.

As noted above, plug 290 may include one or more pins or wires that can be used for data transfer in addition to or instead of power transfer. The data transfer may allow charging station 200 to communicate with a connected device, and/or to adjust operation based on communications with the connected device.

In some embodiments, devices that connect to charging station 200 may have different power requirements, or may support different voltages and/or current. In some such embodiments, charging station 200 may communicate with a connected device in order to discover the power specifications of the connected device and to provide power according to the discovered power specifications.

Figure 8:
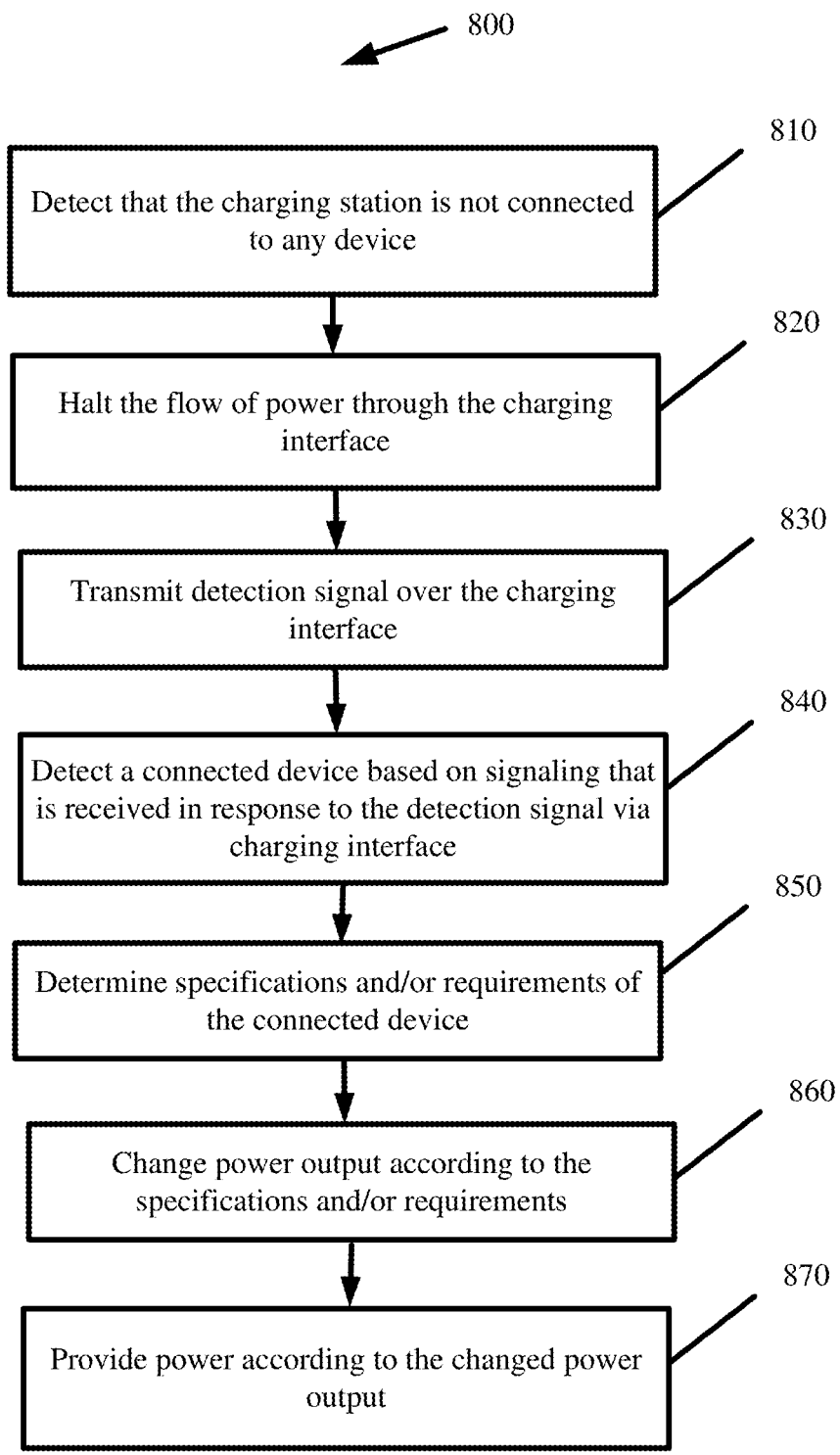
FIG. 8 presents a process by which the charging station adapts operation based on communication with a connected device in accordance with some embodiments described herein.

FIG. 8 presents a process 800 by which charging station 200 adapts operation based on communication with a connected device in accordance with some embodiments described herein. Process 800 may be implemented using a processor of charging station 200.

Process 800 may include detecting (at 810) that charging station 200, and more specifically plug 290, is not connected to any device. For instance, charging station 200 may send a communication signal across plug 290, and may not receive a reply signal in response. Alternatively, charging station 200 may detect that no power is being drawn from plug 290. In response to detecting (at 810) that no device is connected to charging station 200, process 800 may include halting (at 820) the flow of power to plug 290. Charging station 200 may halt (at 820) the flow of power to charging interface 260 (e.g., plug 290) for safety reasons. For instance, it may be unsafe to provide current to plug 290 without a device being connected to charging station 200. Charging station 200 may then enter a standby state.

When in the standby state, process 800 may include periodically transmitting (at 830) a detection signal charging interface 260 (e.g., through plug 290). The detection signal may be used to detect a robot or device that subsequently connects to charging station 200. In particular, charging station 200 may detect a connected device upon receiving (at 840) signaling from the connected device over plug 290 that is responsive to the detection signal transmitted by charging station 200.

Based on the received (at 840) signaling, process 800 may include determining (at 850) specifications and/or requirements of the connected device. For instance, charging station 200 may determine that a first connected device is capable of charging at 18 amperes, and a second connected device is only capable of charging at 10 amperes.

Process 800 may include changing (at 860) power output according to the specifications and/or requirements, and providing (at 870) power through charging interface 260 and/or plug 290 according to the changed power output. Continuing with the example above, charging station may change the power output from 18 amperes to 10 amperes upon detecting the power specifications and/or requirements of the second connected device after having charged the first connected device.

Other changes that charging station 200 can make include changing voltage, the number of pins or wires from which power is transferred to the connected device, and/or the charging duration. Charging station 200 may also use the data interface to monitor the status of the connected device during charging, and may make additional adjustments to the power output based on the status of the connected device. For instance, charging station 200 may deliver a first amount of power to a connected device with a battery that is less than 75% charged, and may deliver a lesser second amount of power to the connected device with the battery that is more than 75% charged.

In some embodiments, charging station 200 may use the data interface to receive large amounts of data from the connected device. For instance, the connected device may lack wireless connectivity or may contain slow wireless connectivity. In such instances, when the device connects to charging station 200, charging station 200 may receive data from the connected device via charging interface 260. Charging station 200 may transfer the data to another system.

In some embodiments, charging station 200 may use the data interface to provide instructions, configuration, commands, and/or data to the connected device while the device is charging. For instance, charging station 200 may provide firmware or software updates to a connected device. Charging station 200 may also power on or power off the connected device via commands that are passed to the connected device via plug 290.

Charging station 200 has various other advantages over prior art charging solutions besides allowing for autonomous adaptive charging (e.g., no human intervention for connecting or disconnecting), data transfer, safer and more secure connections, and less damage to the charging and/or robot components when connecting and disconnecting. The slim profile of charging station 200 allows it to be mounted within the space in which the robots operate without creating obstacles or blockages between charging robots and robots that perform other tasks. Moreover, charging station 200 can be easily relocated based on easy mounting to existing hardware in a site.

Figure 9:
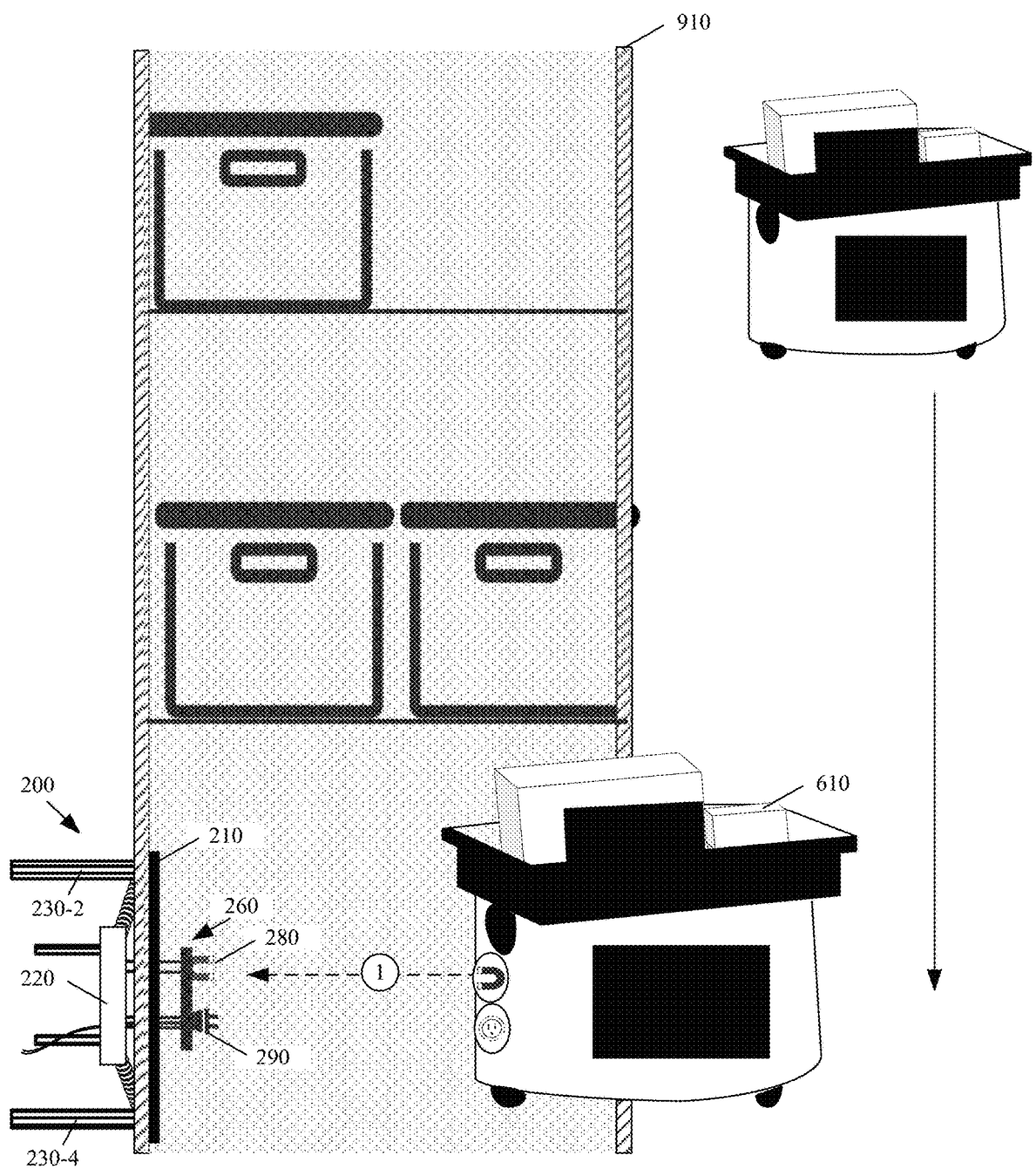
FIG. 9 illustrates an example of placing the charging station with the magnetically-displacing charging interface within the robot work area in accordance with some embodiments.

FIG. 9 illustrates an example of placing charging station 200 within the robot work area, and allowing robot 610 to charge without impeding operations of other robots operating in the same work area in accordance with some embodiments. FIG. 9 illustrates a side cutaway view of storage rack 910. As shown in FIG. 9, front wall 210 of charging station 200 is mounted to, attached to, or otherwise affixed to the back rails or legs of storage rack 910 below a first shelf of storage rack 910.

For instance, a left side of front wall 210 may have one or more holes through which one or more bolts for first set of anchor points 230 (e.g., anchor points 230-1 and 230-3) pass through. The one or more bolts also pass through holes in a left rail or leg of storage rack 910, and nuts may be used to secure the left side of front wall 210 to the left rail or leg of storage rack 910 at anchor points 230-1 and 230-3. Similarly, the right side of front wall 210 may be attached to a back right rail or leg of storage rack 910 using bolts for anchor points 230-2 and 230-4.

Robots may traverse up and down the aisles or open space in front of storage rack 910, and may retrieve and/or place containers, items, and/or other objects onto shelving of storage rack 910. To do so, the robots may include a lift or raiseable platform that rises to different heights of the shelving, and may further include a retriever atop the lift or platform for pushing, pulling, lifting, engaging, and/or transferring objects to and from the shelving.

When robot 610 is in need of charging, robot 610 may collapse its lift or raiseable platform, and may travel (at 1) underneath the first shelf of storage rack 910 to remove itself from the aisle or pathway that other robots use in completing other operations. Robot 610 may then move towards charging interface 260 to establish a power delivery connection based on the magnetic displacement of charging interface 260 so that robot 610 can recharge its battery while robot 610 is out of the way under storage rack 910.

In some embodiments, a warehouse may distribute several charging stations 200 underneath the first shelf of different storage racks to allow multiple robots to simultaneously charge out of the way of other robots operating in the same warehouse or space. This arrangement is advantageous for the warehouse operator as otherwise unused space in the warehouse can be used to charge the robots, and the robots can charge without taking up valuable space that may be allocated for other inventory or operational tasks.

In some embodiments, charging station 200 may be fully enclosed with a housing surrounding the components illustrated in FIGS. 2-5B above. In some such embodiments, charging stations 200 may still be mounted to the storage racks, walls, or other structures of the warehouse to allow for autonomous charging of robots without creating obstacles or blockages in the pathways used by other robots.

In some embodiments, charging station 200 may be equipped with a wireless radio, a microprocessor, storage, and/or one or more sensors. The wireless radio may be used to communicate when charging station 200 is open or available, and when it is occupied with a robot. The wireless radio may also be used to provide charging-related statistics to an administrator or robot controller. For instance, the statistics may identify a robot with a malfunctioning battery that needs to be replaced. In some embodiments, the wireless radio may also be used to communicate with the robots in order to signal the location of charging station 200 to the robots. The microprocessor, storage, and/or sensors can be used to regulate power output to different robots and/or devices. For instance, charging station 200 may increase voltage or current during daytime hours to provide quick charging when robots need to quickly recharge, and may decrease voltage or current during nighttime hours when robots have several hours to recharge.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A device comprising:
    a front wall comprising a rigid surface with an opening;
    a charging interface comprising:
        a back wall disposed behind the front wall with at least one dimension that is greater than a corresponding dimension of the opening;
        at least one support extension extending through the opening with a proximal end behind the front wall and connected to the back wall, and a distal end in front of the front wall;
        at least one magnet disposed about the distal end of the at least one support extension;
        one or more electrodes disposed about the distal end of the at least one support extension; and
        a plurality of springs with a first set of terminating ends connected to the front wall, and an opposite second set of terminating ends connected to the back wall, the plurality of springs providing a displacement of the charging interface about the opening.

2. The device of claim 1 further comprising:
    a first plurality of anchor points distributed about a backside of the front wall, wherein each terminating end from the first set of terminating ends of the plurality of springs is attached to a different anchor point of the first plurality of anchor points; and
    a second plurality of anchor points distributed about the back wall, wherein each terminating end from the second set of terminating ends of the plurality of springs is attached to a different anchor point of the second plurality of anchor points.

3. The device of claim 2, wherein each anchor point of the first plurality of anchor points comprises:
    a bolt comprising:
        an extension passing from a front side of the front wall through a hole in the front wall; and
        a head that is larger than the hole and that abuts the front wall;
    a nut securing the bolt and a terminating end from the first set of terminating ends of the plurality of springs to the front wall.

4. The device of claim 1 further comprising:
    one or more wires running through the at least one support extension to the one or more electrodes, wherein the one or more wires transfer power from a power supply to the one or more electrodes.

5. The device of claim 1 further comprising:
    a plurality of nuts and a plurality of bolts coupling the front wall to legs of a rigid structure.

6. The device of claim 1, wherein the charging interface further comprises:
    a displacing element coupling the one or more electrodes to the distal end of at the least one support extension, the displacing element providing a displacement of the one or more electrodes about the distal end of the at least one support extension.

7. The device of claim 1,
wherein the plurality of springs provide one or more of lateral, vertical, and depth wise displacement of the charging interface in response to a magnetic force that attracts the at least one magnet of the charging interface to another magnet.

8. The device of claim 1,
wherein the at least one magnet is offset from the one or more electrodes by a particular distance; and
wherein the one or more electrodes connect to electrodes of another device based on the displacement of the charging interface drawing the at least one magnet to a magnet of the other device that is offset from the one or more electrodes by the particular distance.

9. The device of claim 1, wherein the at least one magnet comprises:
an electromagnet that generates a magnetic field in response to electrical current.

10. A system comprising:
a robot comprising:
  a battery;
  a charging port located on a particular side of the robot, and connected to the battery; and
  a magnet offset from the charging port by a particular distance at the particular side of the robot; and
a charging station comprising:
  a front wall comprising a rigid surface with an opening;
  a charging interface comprising:
    a proximal end that is located about a backside of the front wall;
    a distal end that is located about a frontside of the front wall;
    one or more extensions that extend from the proximal end through the opening to the distal end;
    a magnet disposed at the distal end; and
    one or more electrodes offset from the magnet by the particular distance at the distal end; and
  at least one displacing element connecting to the front wall at one end and the charging interface at another opposite end, the at least one displacing element suspending the charging interface within the opening and providing a displacement of the charging interface within the opening.

11. The system of claim 10 further comprising:
a magnetic force displacing the charging interface from a default first position to a second position at which the magnet of the charging interface connects to the magnet of the robot, wherein the magnetic force is created based on proximity the magnet of the robot moving to within a specified distance from the magnet of the charging interface.

12. The system of claim 10 further comprising:
an apparatus comprising:
  one or more shelves elevated off a ground surface; and
  a plurality of legs;
wherein the front wall of the charging station is attached to at least two legs of the plurality of legs below the one or more shelves.

13. The system of claim 10 further comprising:
a power supply supplying power to the one or more electrodes, and charging the battery in response to the one or more electrodes connecting to the charging port of the robot.

14. The system of claim 10, wherein the charging interface further comprises:
a back wall at the proximal end, the back wall comprising a rigid surface with one dimension that is larger than a corresponding dimension of the opening, wherein the back wall is separated from the front wall by a distance when the charging interface is at a default resting position.

15. The system of claim 10, wherein at least one extension of the one or more extensions comprises:
a hollowed tube with wiring that connects the one or more electrodes to a power source.

16. A method comprising:
providing a charging interface that is suspended within an opening of a front wall of a charging station by at least one displacing element, the charging interface comprising a magnet and one or more electrodes;
moving a particular side of a robot towards the charging interface, the particular side comprising a charging port and a magnet;
connecting the one or more electrodes to the charging port by displacing the charging interface based on a movement of the at least one displacing element and magnetic forces that are created between the magnet of the robot and the magnet of the charging interface in response to said moving bringing the magnet of the robot in proximity of the magnet of the charging interface; and
charging a battery of the robot via a connection between the one or more electrodes and the charging port.

17. The method of claim 16 further comprising:
moving the robot a first distance away from the charging station after said charging;
displacing a back wall of the charging interface directly against the front wall when the robot is the first distance away from the charging station;
moving the robot a greater second distance away from the charging station; and
disconnecting the one or more electrodes from the charging port based on the charging interface being prevented from moving with the robot to the greater second distance as a result of the back wall abutting against the front wall and the movements of the robot to the greater second distance.

* * * * *